US012716432B2

(12) United States Patent
Carpenter et al.

(10) Patent No.: US 12,716,432 B2
(45) Date of Patent: Aug. 25, 2026

(54) METHOD FOR REAL-TIME HYDRAULIC CYLINDER DRIFT MONITORING

(71) Applicant: Caterpillar Inc., Peoria, IL (US)

(72) Inventors: Richard Andrew Carpenter, Chillicothe, IL (US); Wajahat Afsar, Dunlap, IL (US); Aravind Stalin, Peoria, IL (US); Vinay Kumar Rao Veeramaneni, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 282 days.

(21) Appl. No.: 18/436,941

(22) Filed: Feb. 8, 2024

(65) Prior Publication Data

US 2025/0257746 A1 Aug. 14, 2025

(51) Int. Cl.

| | |
|---|---|
| ***F15B 19/00*** | (2006.01) |
| ***E02F 9/22*** | (2006.01) |
| ***E02F 9/26*** | (2006.01) |
| ***F15B 15/20*** | (2006.01) |
| ***F15B 15/28*** | (2006.01) |
| ***F15B 21/00*** | (2006.01) |
| ***G08B 21/18*** | (2006.01) |

(52) U.S. Cl.

CPC .............. *F15B 19/00* (2013.01); *E02F 9/226* (2013.01); *E02F 9/2271* (2013.01); *E02F 9/267* (2013.01); *F15B 15/20* (2013.01); *F15B 19/005* (2013.01); *F15B 21/008* (2013.01); *G08B 21/182* (2013.01); *F15B 15/28* (2013.01); *F15B 2211/6313* (2013.01); *F15B 2211/6336* (2013.01); *F15B 2211/7053* (2013.01); *F15B 2211/857* (2013.01)

(58) Field of Classification Search

CPC ...... F15B 19/00; F15B 19/005; F15B 21/008; F15B 15/20; F15B 15/28; F15B 2211/6313; F15B 2211/6336; F15B 2211/7053; F15B 2211/857; E02F 9/226; E02F 9/2271; E02F 9/267; G08B 21/182

See application file for complete search history.

(56) References Cited

U.S. PATENT DOCUMENTS

| | | | | |
|---|---|---|---|---|
| 5,691,894 | A | 11/1997 | Fukushima et al. | |
| 7,120,523 | B2 | 10/2006 | Muller | |
| 7,845,169 | B2 | 12/2010 | Brickner et al. | |
| 11,124,947 | B2 | 9/2021 | Miller | |
| 11,840,826 | B1 * | 12/2023 | Nackers | E02F 9/267 |

(Continued)

FOREIGN PATENT DOCUMENTS

| | | | |
|---|---|---|---|
| CN | 102826013 | B | 6/2015 |
| CN | 105736515 | B | 6/2017 |

(Continued)

*Primary Examiner* — Ryan D Walsh

(57) ABSTRACT

A method of monitoring drift in a hydraulic cylinder, including providing a work machine having an implement actuated by the hydraulic cylinder, a sensor attached to the hydraulic cylinder configured to measure a displacement of the hydraulic cylinder and a controller; identifying a cycle start of the hydraulic cylinder; identifying a cycle end of the hydraulic cylinder; calculating a drift rate of the hydraulic cylinder; determining if the drift rate is greater than a drift threshold; and if the drift rate is greater than the drift threshold, notifying service personnel that service of the hydraulic cylinder is required.

14 Claims, 4 Drawing Sheets

(56) References Cited

U.S. PATENT DOCUMENTS

| | | | | |
|---|---|---|---|---|
| 2016/0333902 | A1 | 11/2016 | Hodel | |
| 2017/0138018 | A1* | 5/2017 | Beschorner | E02F 9/2296 |
| 2019/0063473 | A1* | 2/2019 | Barrick | F15B 19/002 |
| 2025/0075714 | A1* | 3/2025 | Hennen | G01M 13/00 |

FOREIGN PATENT DOCUMENTS

| | | | |
|---|---|---|---|
| CN | 113153722 | A | 7/2021 |
| DE | 102018200066 | A1 | 7/2019 |

* cited by examiner

METHOD FOR REAL-TIME HYDRAULIC CYLINDER DRIFT MONITORING

TECHNICAL FIELD

The present disclosure generally relates to work machines, and more specifically relates to hydraulic cylinders for implements of work machines.

BACKGROUND

Mobile work machines may be used in the heavy industries such as mining, construction, and the like to transport materials and personnel. These work machines are often large in size, and require an operator, e.g., a driver, to manually operate the machine in order for the machine to perform its designated/intended operations.

Certain work machines, such as loaders, use implements to perform various tasks on a work site. These implements may be required to carry and transfer heavy loads, and as such, may utilize hydraulic systems to aid in operating mechanisms for the implements. These hydraulic systems are required to be robust in order to withstand the heavy loads, and failure of hydraulic components can often lead to treacherous results.

In the field of hydraulic systems, the phenomenon of hydraulic cylinder drift poses a significant challenge. Hydraulic cylinder drift refers to the unintended and gradual movement of the piston within a hydraulic cylinder, often in a downward direction. Hydraulic cylinder drift may be caused by a variety of factors such as internal fluid leakage such as oil leaking from seals within the cylinder, faults in the hydraulic system such as faulty relief valves, external leaks, or other factors. Hydraulic cylinder drift may occur at a drift rate defined as a certain amount of drift over time, and may be small, for example, only on the order of 10-100 mm per minute, and may be difficult for an operator to detect.

Hydraulic cylinder drift can lead to inefficiencies and potential hazards in various industrial and mechanical applications. Addressing hydraulic cylinder drift is crucial for maintaining system precision, stability, and overall operational safety.

In light of the aforementioned shortcomings, there remains a need to a method for monitoring hydraulic cylinder drift in real time. There also remains a need for a method for monitoring hydraulic cylinder drift that can notify operators and service personnel that a hydraulic cylinder requires servicing.

SUMMARY OF THE DISCLOSURE

In accordance with one aspect of the disclosure, a work machine may be provided. The work machine may include a frame, a ground engaging member supporting the frame, an engine supported by the frame, and a controller configured to control operation of the work machine. The work machine may include an implement supported by the frame. The work machine may include a hydraulic cylinder connected to the implement and the frame, configured to be actuated by an operator input connected to the controller. The work machine may include a sensor attached to the hydraulic cylinder and connected to the controller. The sensor of the work machine may be configured to measure an actuation of the hydraulic cylinder over time. The controller may be configured to receive an actuation data from the sensor, evaluate a drift rate of the hydraulic cylinder, and provide a service notification if the drift rate is greater than a drift threshold.

In accordance with another aspect of the disclosure, a hydraulic cylinder may be provided. The hydraulic cylinder may include a cylinder body having a first body end and a second body end, the cylinder body having a cylinder connector at the second body end, the cylinder body being hollow. The hydraulic cylinder may include a rod having a first rod end and a second rod end, the rod having a rod connector at the first rod end. The hydraulic cylinder may include a piston connected to the second rod end, the piston interfacing with an inside wall of the cylinder body. The hydraulic cylinder may include a sensor disposed on the hydraulic cylinder, the sensor configured to measure an actuation of the hydraulic cylinder. The hydraulic cylinder may include a controller connected to the sensor. The controller may be configured to receive a measurement of the actuation from the sensor, evaluate a drift rate of the hydraulic cylinder, and provide a service notification if the drift rate is greater than a drift threshold.

In accordance with yet another aspect of the disclosure, a method of monitoring drift in a hydraulic cylinder may be provided. The method may include providing a work machine having an implement actuated by the hydraulic cylinder, providing a sensor attached to the hydraulic cylinder configured to measure a displacement of the hydraulic cylinder, and providing a controller. The method may include identifying a cycle start of the hydraulic cylinder and identifying a cycle end of the hydraulic cylinder. The method may include calculating a drift rate of the hydraulic cylinder and determining if the drift rate is greater than a drift threshold. The method may include notifying service personnel that service of the hydraulic cylinder is required, if the drift rate is greater than the drift threshold.

These and other aspects and features of the present disclosure will be more readily understood when read in conjunction with the accompanying drawings.

DETAILED DESCRIPTION

Figure 1:
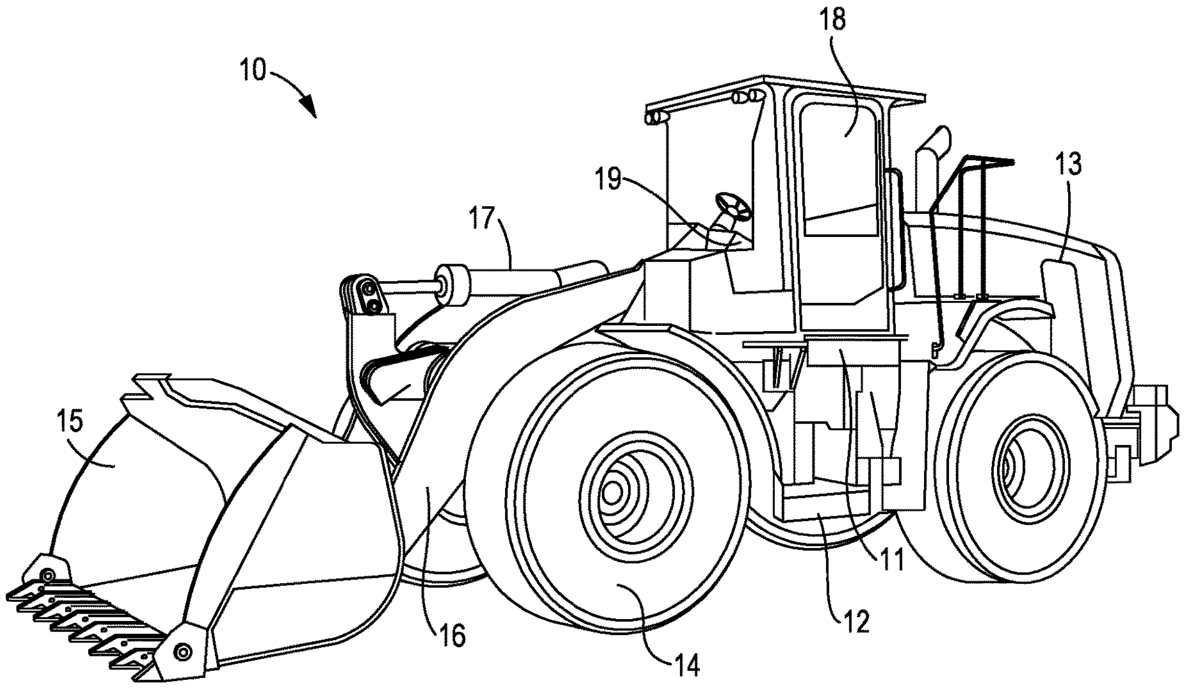
FIG. 1 is a perspective view of a work machine constructed in accordance with an embodiment of the present disclosure.

Referring now to the drawings, and with specific reference to FIG. 1, a work machine is depicted and generally referred to using reference numeral 10. The work machine 10 is exemplarily embodied in the form of a loader. While the work machine 10 is depicted as a loader, it should be noted that a type of machine used is merely exemplary and illustrative in nature. It will be acknowledged that the teachings of the present disclosure can be similarly applied to other types of work machines including but not limited to on and off highway trucks, excavators, track-type tractors, mining vehicles, and other types of machines having hydraulic cylinders known to persons skilled in the art.

Work machines, and specifically loaders, may be used to lift, transport, and deposit material from one spot to another. The work machine 10 is supported by a frame 11. The work machine 10 may include a drivetrain 12 powered by an engine 13 and driving ground-engaging members 14 contacting the ground and supporting the frame 11 in order to operate the work machine 10.

The work machine 10 may also include an implement 15 to perform a work job. In the view of FIG. 1, since the work machine 10 is a loader, the implement 15 is exemplarily depicted as a dump body, but with other machines the implement may be other types of work implements known to persons skilled in the art. The implement 15 may be connected to the frame 11 of the work machine by an implement arm 16, and may be actuated by a hydraulic cylinder 17. The work machine 10 may also include an operator cabin 18 for an operator to control the operation of the work machine 10. The operator cabin 18 may include a controller 19 for the operator to use to direct the work machine 10.

Figure 2:
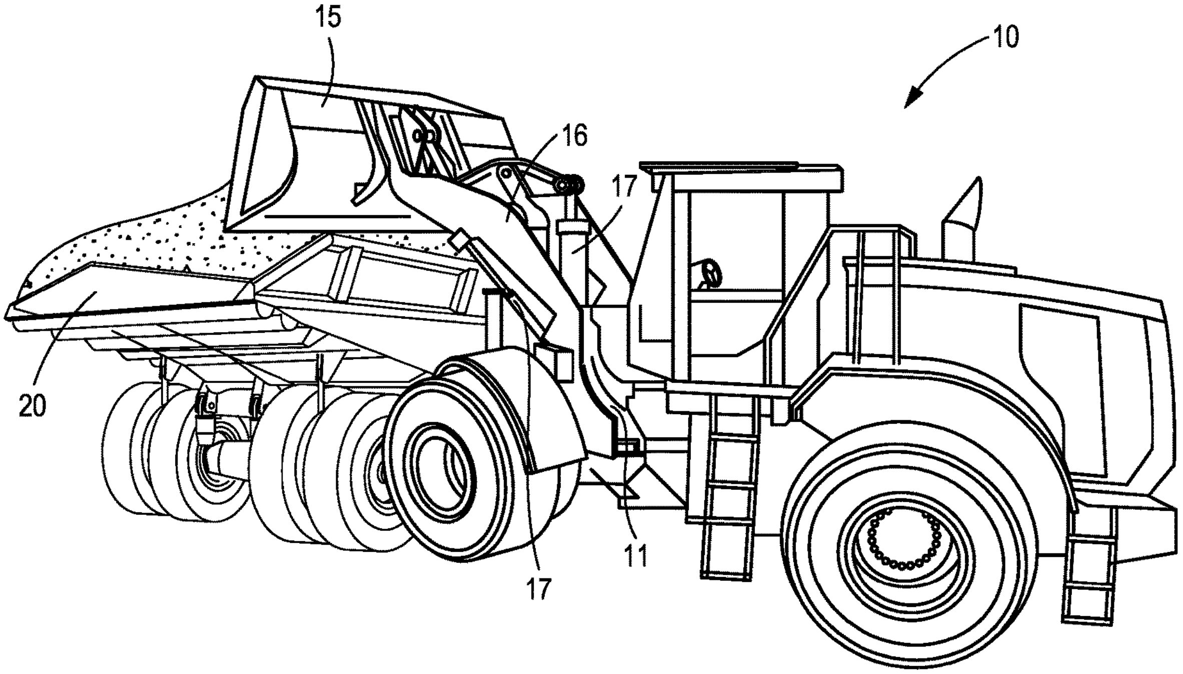
FIG. 2 is a perspective view of a work machine with an implement arm having a hydraulic cylinder constructed in accordance with an embodiment of the present disclosure.

FIG. 2 depicts the work machine 10 in its capacity as a loader loading material onto a dump truck 20. The operator of the work machine 10 controls operation of the implement arm 16 and the implement 15 through the controller 19 to scoop material, lift the material, and deposit the material within the dump truck 20. In the quantities that the work machine 10 may be capable of accumulating, assistance is required to lift the load, and in order to do so, the hydraulic cylinder 17 is disposed on the work machine.

In the work machine 10 of FIG. 2, several of the hydraulic cylinder 17 are connected to various components of the work machine 10 such that the operator can control operation of several movements, such as the implement 15 relative to the implement arm 16, the implement arm 16 relative to the frame 11, among others. While the work machine 10 is depicted having multiple of the hydraulic cylinder 17, other machines as known may include one or more of the hydraulic cylinder 17 where hydraulic actuation assistance is required.

Figure 3:
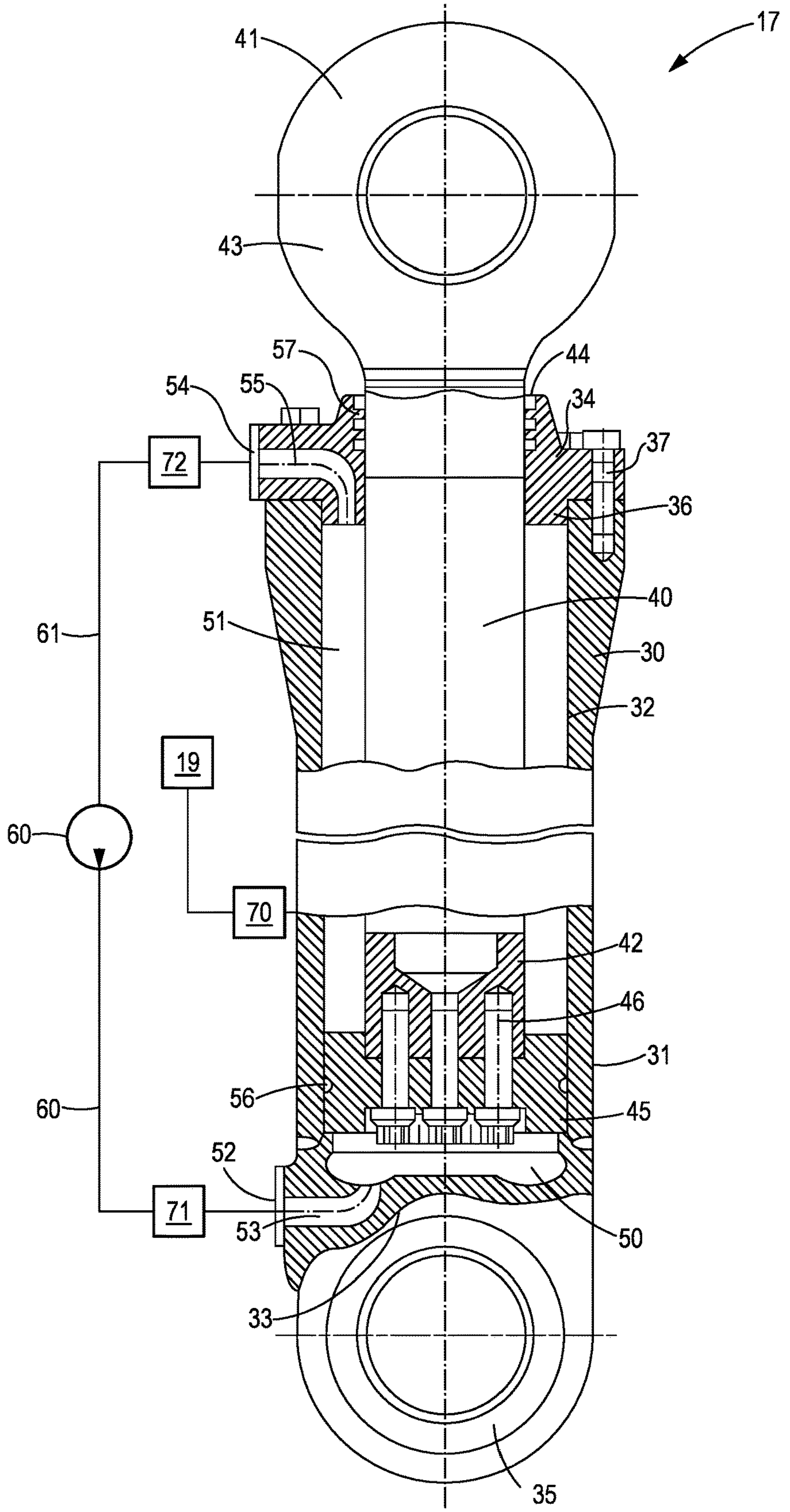
FIG. 3 is a cross-sectional view of a hydraulic cylinder constructed in accordance with an embodiment of the present disclosure.

FIG. 3 depicts the hydraulic cylinder 17 in a cross-sectional view. The hydraulic cylinder 17 may be composed of a cylinder body 30 with an outside surface 31 and an inside surface 32. The cylinder body 30 may have a first body end 33 and a second body end 34. In the hydraulic cylinder 17 of FIG. 3, the first body end 33 is depicted having a cylinder connector 35, which may be an eye end connector, or any other connector as known. The second body end 34 is shown in FIG. 3 as having a cap 36 to seal the second body end 34, however, other embodiments of the second body end 34 may include enclosures that are integral with the cylinder body 30. In order to connect the cap 36 to the cylinder body 30, fasteners 37 may be provided. In the depiction of FIG. 3, the fasteners 37 are depicted as bolts, but any other fasteners as known may be utilized.

A rod 40 is disposed within the cylinder body 30. The rod 40 may also have a first rod end 41 and a second rod end 42. The rod 40 may also include a rod connector 43 disposed on the first rod end 41. As with the cylinder connector 35, the rod connector 43 may also be an eye end connector, or may be any other connector as known. A rod orifice 44 may be formed into the cap 36 of the cylinder body 30 such that the rod 40 may move relative to the cylinder body 30.

The rod 40 includes a piston 45 disposed on the second rod end 42. The piston 45 may be attached to the second rod end 42 through fasteners 46, which in FIG. 3 are also shown as bolts, but as with fasteners 37, other fasteners or connection techniques as known may be utilized to connect the piston 45 to the second rod end 42. The piston 45 extends outwardly within the hydraulic cylinder 17 such that an outer surface of the piston 45 interacts with the inside surface 32 of the cylinder body 30.

Due to this extending of the piston 45, two volumes are formed within the hydraulic cylinder 17. A first volume 50 is formed between the first body end 33 and the piston 45, and a second volume 51 is formed between the second body end 34 and the piston 45. The second volume 51 surrounds the rod 40 within the cylinder body 30. A first orifice 52 may be provided at the first body end 33 of the cylinder body 30, and may connect to the first volume 50 via a first fluid passage 53. Similarly, a second orifice 54 may be provided at the second body end 34, and may connect to the second volume 51 via a second fluid passage 55. As depicted in FIG. 3, the second orifice 54 and the second fluid passage 55 may be disposed within the cap 36.

In order to actuate the hydraulic cylinder 17, a hydraulic system may be provided to send hydraulic fluid to both the first volume 50 and the second volume 51. The hydraulic system may include a pump 60 and hydraulic line 61 to deliver hydraulic fluid to the first orifice 52 and the second orifice 54. Hydraulic fluid is required to be contained within the first volume 50 and the second volume 51, especially during actuation of the rod 40 within the cylinder body 30. Therefore, a piston seal 56 is disposed on an outside surface of the piston 45 to maintain bifurcation between the first volume 50 and the second volume 51, and a rod seal 57 is disposed at the second body end 34 about the rod 40 in order to prevent fluid leaks from the second volume 51 though the rod orifice 44.

A sensor 70 may be disposed on the hydraulic cylinder 17 in order to measure various actuation parameters of the hydraulic cylinder 17. The sensor 70 may be a position sensor, and actuation of the hydraulic cylinder 17 is measured as the displacement of the rod 40 relative to the cylinder body 30. The sensor 70 may also be an angle sensor, and actuation of the hydraulic cylinder 17 is measured as change in a rotational position of the hydraulic cylinder 17. Additionally, the hydraulic system may include a first volume pressure sensor 71 and a second volume pressure sensor 72 in order to monitor the fluid pressures of the first volume 50 and the second volume 51, respectively.

INDUSTRIAL APPLICABILITY

In operation, the teachings of the present disclosure can find applicability in many industries including but not limited to work machines used in the earth moving, mining, agricultural, and construction industries. While depicted and described in conjunction with a loader, such teachings can also find applicability with other machines such as on and off highway trucks, excavators, track-type tractors, mining vehicles, and other types of machines having hydraulic cylinders known to persons skilled in the art.

Figure 4:
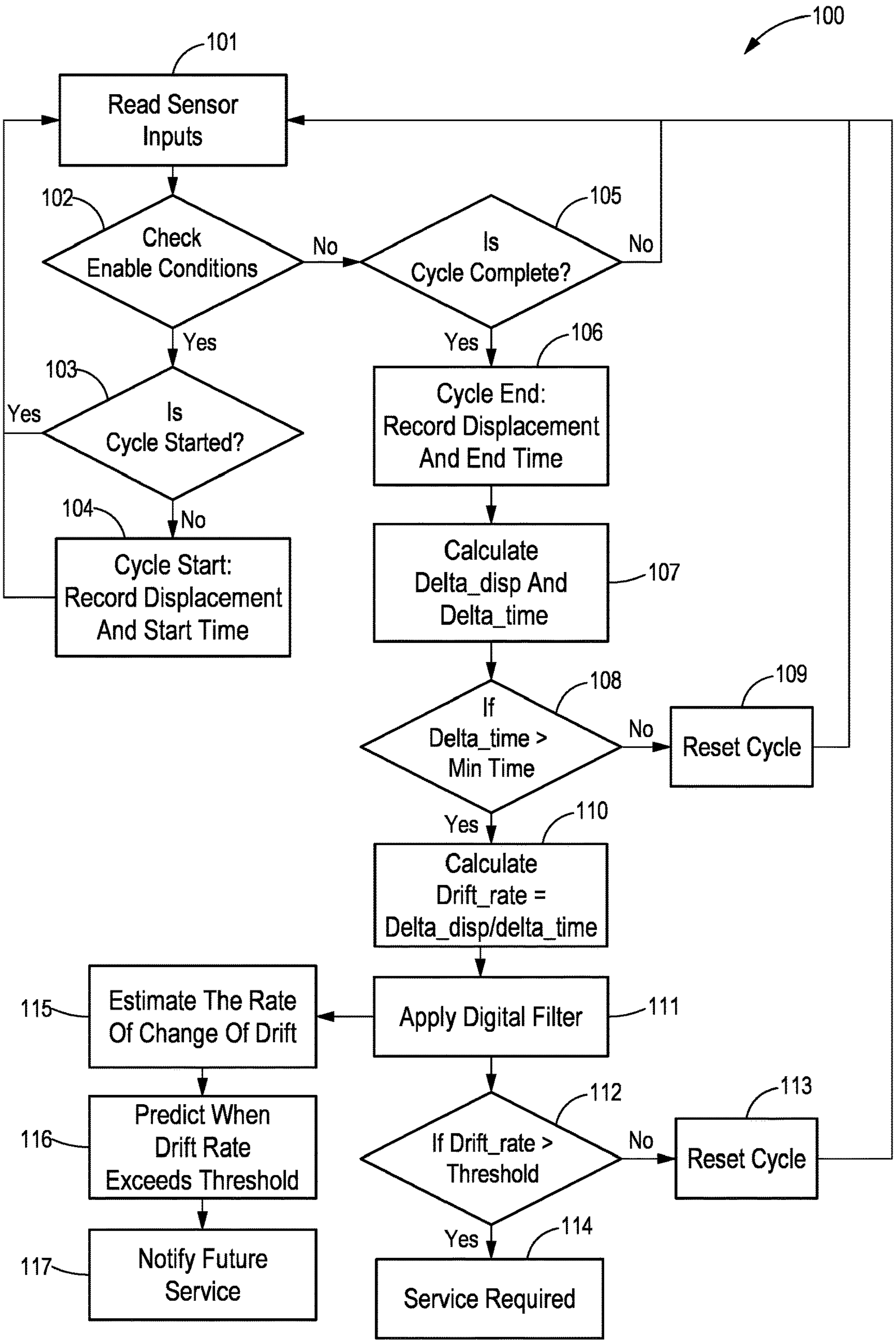
FIG. 4 is a flowchart depicting a sample sequence of steps for monitoring drift in a hydraulic cylinder, which may be practiced in accordance with the locomotive of the present disclosure.

FIG. 4 illustrates a visual representation of a method 100 for monitoring drift in the hydraulic cylinder 17. In a first step 101, the controller 19 performs a preliminary read of the sensor 70 as well as the first volume pressure sensor 71 and the second volume pressure sensor 72, and in a second step 102, identifies that certain conditions are true corresponding to a start of an actuation of the hydraulic cylinder 17. These conditions may include a starting pressure in both the first volume 50 and the second volume 51 indicative of the implement 15 being unloaded, a starting displacement of the hydraulic cylinder 17, and identifying that zero input has been provided from the operator. Concurrently, if the conditions are true, in a third step 103 the controller 19 may determine whether a cycle has started. If not, in a fourth step 104, the controller 19 may record the start displacement and start time of a cycle start of the hydraulic cylinder 17.

Once the actuation of the hydraulic cylinder 17 has been completed, in a fifth step 105, the controller 19 may identify certain conditions register false, for instance ending pressure in the first volume 50 and the second volume 51, ending displacement of the hydraulic cylinder 17, and identifying that zero input is again provided by the operator. The controller 19 may identify whether the cycle is complete. If so, once again, the controller 19 may record the end displacement and an end time of a cycle end of the hydraulic cylinder 17 in a sixth step 106.

The controller 19 may then calculate a drift rate of the hydraulic cylinder 17 during the cycle. In a seventh step 107, the controller 19 may calculate a change in displacement for the cycle (also known as delta displacement), and may calculate a change in time for the cycle (also known as delta time). The controller 19 may be programmed to only accept data for cycles that have a delta time greater than a minimum time. In an eighth step 108, the controller 19 references the minimum time to determine if the delta time for a specific cycle is greater than the minimum time. If not, the cycle data is not used, and in a ninth step 109 the controller 19 resets the cycle.

If the delta time is greater than the minimum time, in a tenth step 110, the controller 19 calculates drift rate as delta displacement over delta time. Optionally, the controller may take the calculated drift rate and, in an eleventh step 111, apply a digital filter to the calculated drift rate in order to remove outliers and excess noise. While the digital filter of the eleventh step 111 is depicted as a moving average filter, any other digital filter as known may be utilized. The controller 19, in a twelfth step 112, determines whether the drift rate is greater than a drift threshold. If not, in a thirteenth step 113 the cycle data is logged by the controller 19, and the method 100 is restarted. If so, in a fourteenth step 114, the controller 19 provides a notification through an operator display in the operator cabin 18 of the work machine 10, or may provide notification through telematics to a remote location where service personnel may be located. The method 100 may be repeated many times during operation of the work machine 10, for instance for each actuation of the hydraulic cylinder 17.

Optionally, the controller 19 may use the captured data to predict when the drift rate may exceed the threshold in the future. For example, the drift rate may increase over several cycles. In a fifteenth step 115, the controller 19 may estimate this rate of change of the drift rate, provide a prediction of when the drift rate will be greater than the drift threshold in a sixteenth step 116, and provide a notification in a seventeenth step 117 similar to the service notification of the fourteenth step 114.

The method 100 for monitoring drift in a hydraulic cylinder describes operation of the work machine 10 of the primary embodiment, and how in operation, the work machine 10 may evaluate operability of any of the hydraulic cylinder 17 operated by the work machine 10. The method 100 allows for the work machine 10 to identify when drift of the hydraulic cylinder 17, if any, becomes excessive before an operator can. Real time monitoring, as specified in the method 100, would negate the need for additional service tests of the hydraulic cylinder 17. However, once excessive drift is identified, service personnel would still be required to diagnose the cause of the drift, whether it be seal wear, faulty valves, external leakage, or other causes.

The method 100 can be adapted to any work machine 10, requiring only a software update to retrofit. The method 100 can also be adapted to other industries and any machine utilizing hydraulic cylinders to actuate mechanisms of the machine.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited. The sensor 70 may also be an other sensor as known that may be used to measure change in the hydraulic cylinder 17 than may be attributed to actuation of the hydraulic cylinder 17.

What is claimed is:

1. A hydraulic cylinder, comprising:

a cylinder body having a first body end and a second body end, the cylinder body having a cylinder connector at the second body end, the cylinder body being hollow;

a rod having a first rod end and a second rod end, the rod having a rod connector at the first rod end;

a piston connected to the second rod end, the piston interfacing with an inside wall of the cylinder body;

a first volume within the cylinder body between the piston and the second body end and a second volume within the cylinder body, surrounding the rod, between the piston and the first body end;

a first orifice at the first body end of the cylinder body having a first fluid passage connecting the first orifice to the first volume;

a sensor disposed on the hydraulic cylinder, the sensor configured to measure an actuation of the hydraulic cylinder; and a controller connected to the sensor, the controller configured to receive a measurement of the actuation from the sensor, evaluate a drift rate of the hydraulic cylinder, and provide a service notification if the drift rate is greater than a drift threshold.

2. The hydraulic cylinder of claim 1, further comprising a second orifice at the second body end of the cylinder body having a second fluid passage connecting the second orifice to the second volume.

3. The hydraulic cylinder of claim 2, further comprising a first pressure sensor configured to measure a first pressure of the first volume, and a second pressure sensor configured to measure a second pressure of the second volume, the controller configured to calculate the actuation of the hydraulic cylinder from changes in the first pressure and the second pressure.

4. The hydraulic cylinder of claim 1, wherein the sensor is a position sensor, and the actuation of the hydraulic cylinder is measured as displacement of the rod relative to the cylinder body.

5. The hydraulic cylinder of claim 1, wherein the sensor is an angle sensor, and the actuation of the hydraulic cylinder is measured as change in a rotational position of the hydraulic cylinder.

6. A method of monitoring drift in a hydraulic cylinder, comprising: providing a work machine having an implement actuated by the hydraulic cylinder, a sensor attached to the hydraulic cylinder configured to measure a displacement of the hydraulic cylinder and a controller; identifying a cycle start of the hydraulic cylinder, including recording a start displacement of the hydraulic cylinder, and a start time; and the step of identifying the cycle end further comprising; identifying a cycle end of the hydraulic cylinder, including recording an end displacement of the hydraulic cylinder, and an end time; calculating a drift rate of the hydraulic cylinder by calculating a delta displacement between the start displacement and the end displacement, and calculating a delta time between the start time and the end time; determining if the drift rate is greater than a drift threshold; and notifying service personnel that service of the hydraulic cylinder is required, if the drift rate is greater than the drift threshold.

7. The method of claim 6, wherein calculating the drift rate further comprises determining if the delta time is greater than a minimum time, and calculating the drift rate as the delta displacement divided by the delta time.

8. The method of claim 6, after calculating the drift rate further comprising the steps of:

calculating a rate of change of the drift rate;

predicting a target date when the drift rate will exceed the drift threshold; and notifying service personnel that service of the hydraulic cylinder is required at the target date.

9. The method of claim 6, further comprising applying a digital filter after calculating the drift rate in order to remove excess noise or outlier points.

10. A method of monitoring drift in a hydraulic cylinder, comprising:

providing a work machine having an implement actuated by the hydraulic cylinder, a sensor attached to the hydraulic cylinder configured to measure a displacement of the hydraulic cylinder and a controller;

identifying a cycle start of the hydraulic cylinder;

identifying a cycle end of the hydraulic cylinder;

calculating a drift rate of the hydraulic cylinder;

calculating a rate of change of the drift rate;

determining if the drift rate is greater than a drift threshold;

notifying service personnel that service of the hydraulic cylinder is required, if the drift rate is greater than the drift threshold;

predicting a target date when the drift rate will exceed the drift threshold, if the drift rate is below the threshold; and notifying service personnel that service of the hydraulic cylinder is required at the target date.

11. The method of claim 10, the step of identifying the cycle start further comprising recording a start displacement of the hydraulic cylinder, and a start time; and the step of identifying the cycle end further comprising recording an end displacement of the hydraulic cylinder, and an end time.

12. The method of claim 11, wherein calculating the drift rate further comprises calculating a delta displacement between the start displacement and the end displacement, and calculating a delta time between the start time and the end time.

13. The method of claim 12, wherein calculating the drift rate further comprises determining if the delta time is greater than a minimum time, and calculating the drift rate as the delta displacement divided by the delta time.

14. The method of claim 10, further comprising applying a digital filter after calculating the drift rate in order to remove excess noise or outlier points.

* * * * *